United States Patent [19]

Tanaka

[11] Patent Number: 4,979,018
[45] Date of Patent: Dec. 18, 1990

[54] SEMICONDUCTOR DEVICE WITH PARALLEL MULTIPLIER USING AT LEAST THREE WIRING LAYERS

[75] Inventor: Shigeru Tanaka, Fujisawa, Japan
[73] Assignee: Kabushiki Kaisha Toshiba, Kawasaki, Japan
[21] Appl. No.: 407,152
[22] Filed: Sep. 14, 1989
[30] Foreign Application Priority Data

Dec. 16, 1988 [JP] Japan ................................. 63-318235

[51] Int. Cl.$^5$ ............................................. H01L 23/48
[52] U.S. Cl. ...................................... 357/71; 357/75; 364/786; 364/768
[58] Field of Search .................... 357/71, 75; 364/786, 364/768

[56] References Cited
U.S. PATENT DOCUMENTS 4,556,948 12/1985 Mercy .................................. 364/786
4,605,470 8/1986 Gwozdz et al. .................. 357/71 R Primary Examiner—Rolf Hille
Assistant Examiner—Steven Loke
Attorney, Agent, or Firm—Finnegan, Henderson, Farabow, Garrett, and Dunner

[57] ABSTRACT

In a semiconductor device of the present invention, partial products of a multiplicand and a specific bit of a multiplier are formed by a plurality of partial product producing circuits. The results of multiplication obtained from the partial product producing circuits are output to one of full adders serving as first partial sum producing circuits through a first connection wire formed of a first metal wiring layer and a second metal wiring layer formed above the first layer. In the first full adders, specific bits of the partial product producing circuits are grouped for addition. The result of this addition is output to a second full adder through a second connection wire formed of a third metal wiring layer formed above the second layer. In the second full adder, the results of addition obtained from the first full adders are added together, and then the result obtained from the second full adder is output to other full adders and a final full adder to obtain the product of the multiplicand and the multiplier.

13 Claims, 6 Drawing Sheets $$
\begin{array}{r}
A_1\ A_2\ A_3\ A_4\ A_5\ A_6\ A_7\ A_8 \\
\times\ B_1\ B_2\ B_3\ B_4\ B_5\ B_6\ B_7\ B_8 \\
\hline
\end{array}
$$

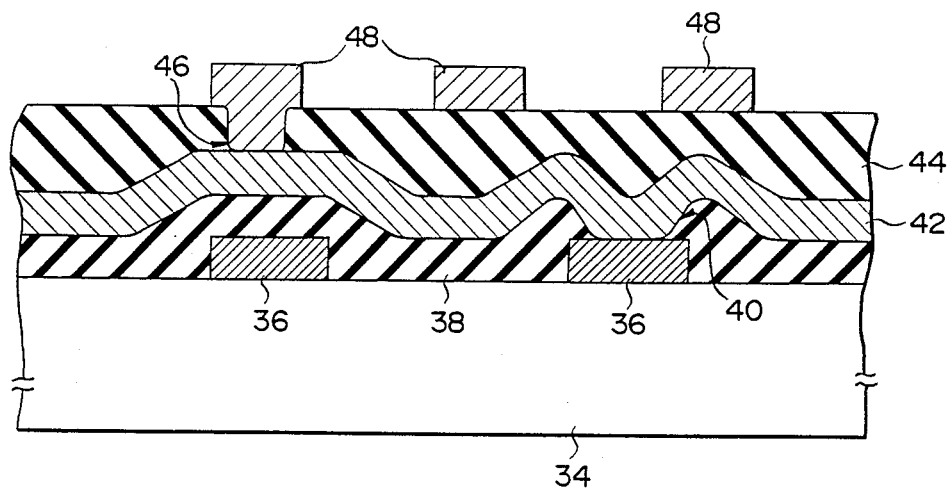
F I G. 6

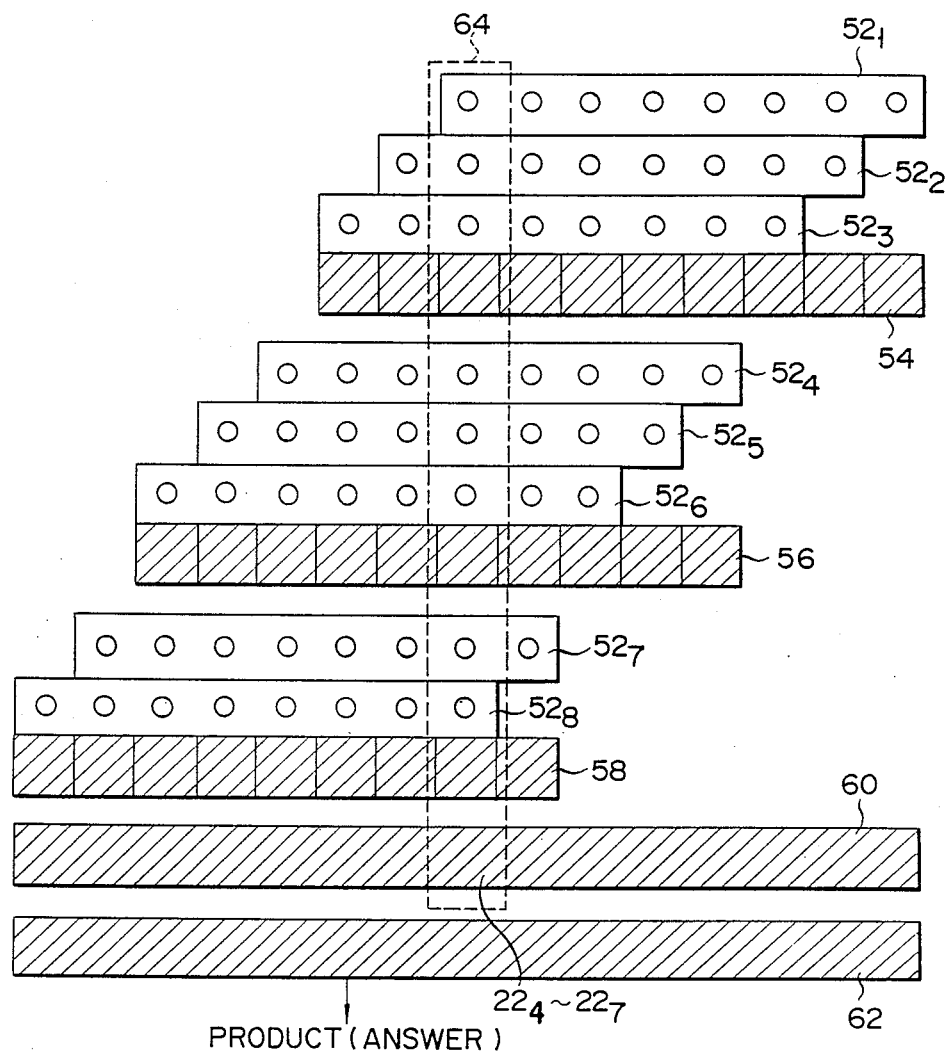
PRODUCT (ANSWER)  $22_4 \sim 22_7$
F I G. 7

SEMICONDUCTOR DEVICE WITH PARALLEL MULTIPLIER USING AT LEAST THREE WIRING LAYERS

BACKGROUND OF THE INVENTION

1. Field of the Invention

The present invention relates to a semiconductor device, and more particularly, to a semiconductor device with a parallel multiplier using at least three wiring layers.

2. Description of the Related Art

High-performance and high-speed data processing devices are in increasing demand. To realize high-speed multiplication, LSIs adapted for parallel-multiplication or LSIs which incorporate parallel-multiplication macrocells (functional blocks subjected to design verification test) have been in wide use recently. By significant advances in hardware technology, an LSI may incorporate a large-scale parallel multiplier. For instance, a parallel multiplier for two 32-bit numbers has already been implemented.

Such a parallel multiplier forms the product of a multiplicand and a multiplier in accordance with the following process: (1) Partial products are generated, and (2) The resulting partial products are summed to provide the product. Such an arithmetic operation is described in an article entitled "Outlook on circuit systems of parallel multipliers which are now in progress of LSI version", NIKKEI ELECTRONICS in Japanese, May 29, 1978.

For instance, let us consider parallel multiplication of two 8-bit numbers as shown in FIG. 1. In this Figure, $A_1$ to $A_8$ represent the bits of a multiplicand, while $B_1$ to $B_8$ the represent multiplier bits. $a_1$ to $a_8$, $b_1$ to $b_8$, $c_1$ to $c_8$, $d_1$ to $d_8$, $e_1$ to $e_8$, $f_1$ to $f_8$, $g_1$ to $g_8$ and $h_1$ to $h_8$ represent sets $10_1$, $10_2$, $10_3$, $10_4$, $10_5$, $10_6$, $10_7$ and $10_8$ of partial products and $p_1$ to $p_{15}$ represent the product bits. The sets of partial products result from multiplying the multiplicand by a specific bit of the multiplier.

The addition of the partial products described above is generally carried out in the two following ways.

(1) Carry save method: FIG. 2 illustrates that portion of an array circuit for performing parallel multiplication of two 4-bit numbers which corresponds to the partial products $10_1$–$10_8$ of FIG. 1. That is, partial products $12_1$, resulting from multiplying a multiplicand by respective bit of a multiplier, are applied to full adders $14_1$ to $14_3$ and a $q_8$ (product bit) output. The most significant bit of next partial products $12_2$ is applied to a next-stage full adder $14_4$, while the remaining bits thereof are applied to full adders $14_1$, $14_2$, $14_3$ together with the three high-order bits of the preceding partial products $12_1$. As a result, the carries (C) of full adders $14_1$, $14_2$ and $14_3$ are supplied to next-stage full adders $14_4$, $14_5$ and $14_6$, respectively, and the sums (S) thereof are applied to full adders $14_5$ and $14_6$ and $q_7$ (product bit) output. Similarly, in full adders $14_4$, $14_5$ and $14_6$, the carries (C) from full adders $14_1$, $14_2$ and $14_3$ are added to corresponding bits of partial products $12_3$ and the results are applied to full adders $14_7$, $14_8$ and $14_9$ and $q_6$ output. Furthermore, full adders $14_7$, $14_8$ and $14_9$ add the carries (C) from full adders $14_4$, $14_5$ and $14_6$ to corresponding bits of partial products $12_4$ and then provide the resulting bits to high-speed adder 16 and $q_5$ output. High-speed adder 16 provides high-order bits $q_1$–$q_4$ of the product.

(2) Tree method: Unit blocks for performing an addition of a predetermined number of inputs are properly combined to perform addition for each digit of a product. FIG. 3 shows an 8-input adder for a set 20 of specific bits, for example, $a_1$, $b_2$, $c_3$, $d_4$, $e_5$, $f_6$, $g_7$ and $h_8$ included in partial products $10_1$ to $10_8$ shown in FIG. 1. In this example, a 3-input, 2-output full adder is used as the unit block. In FIG. 3, among the specific bits of the partial products $10_1$–$10_8$ of FIG. 1 $a_1$, $b_2$ and $c_3$ are added together in full adder $22_1$, $d_4$, $e_5$ and $f_6$ in full adder $22_2$, and $g_7$ and $h_8$ in full adder $22_3$. The carry outputs of full adders $22_1$–$22_3$ are applied to the higher order bits not shown, while the partial sums $24_1$, $24_2$ and $24_3$ are directed to full adder $22_4$. The partial sum $24_4$ from full adder $22_4$ is applied to full adder $22_6$ together with the partial sum $24_5$ from full adder $22_5$ receiving carries from the lower order bits not shown. On the other hand, the carry from full adder $22_4$ is output to a higher order bit together with the carry from full adder $22_5$. Full adder $22_6$ adds together the partial sums $24_4$ and $24_5$ from full adders $22_4$, $22_5$ and a carry from a lower bit to provide the partial sum $24_6$ to full adder $22_7$. Full adder $22_7$ adds together the partial sum $24_6$ from full adder $22_6$ and a carry from the lower order bit to provide the carry and sum to a high-speed adder not shown. Such an adder circuit as described above is provided for each digit of the partial product sets $10_1$–$10_8$ to obtain the product (answer).

FIG. 4 shows the basic circuit arrangement of the full adder of 3-input, 2-output AND-OR form in the prior art described above.

In this Figure, an A input is applied to AND circuits $26_1$, $26_4$, $26_5$ and $26_6$, a B input to AND circuits $26_2$, $26_4$, $26_5$ and $26_7$, and a CO input to AND circuits $26_3$, $26_4$, $26_6$ and $26_7$. The A input is further applied to AND circuits $26_2$ and $26_3$ via an inverter $28_1$. Likewise the B input is applied to AND circuits $26_1$ and $26_3$ via an inverter $28_2$, and the C input to AND circuits $26_1$ and $26_2$ via an inverter $28_3$. AND circuits $26_1$ to $26_4$ feed their computational results to an OR circuit $30_1$, while AND circuits $26_5$ - $26_7$ provide their operational results to an OR circuit $30_2$. To the next stage (higher order bit), the output of OR circuit $30_1$ as the sum (S) and the output of OR circuit $30_2$ as the carry (C) are applied.

According to the carry save method described above, LSIs can implement the parallel multiplication by the use of a highly regular layout of circuit components. However, an array of $(n-1)$ full adders is needed to add together n partial products. Hence problems associated with the above approach lie in the need of long signal transmission paths. The long signal transmission paths will slow the computing speed.

According to the tree method, on the other hand, the number of full adders to path through may be small. In this respect the computation can be speeded up. However, since the blocks in the prior art are wired by the use of first and second metal wiring layers formed on a semiconductor substrate, an increase in wiring in number between the blocks will result in the complication of wiring of blocks and the need of a large number of steps in pattern layout. In addition, the increase of wiring in number will increase the area of an LSI chip as well, resulting in a problem that high-speed processing is impeded.

SUMMARY OF THE INVENTION

It is accordingly an object of the present invention to provide a semiconductor device with a parallel multiplier using at least three wiring layers, which permits the speeding up of computation without increasing the area of an LSI chip and avoids the need for a large number of steps in pattern layout.

According to an aspect of the present invention, there is provided a semiconductor device with a parallel multiplier comprising: a plurality of partial product producing means for forming partial products by multiplying one of a multiplier and a multiplicand by a specific bit of the other of the multiplier and multiplicand; a plurality of first connection and wiring means having at least two sets of ends, a first set of ends connected to said plurality of partial product producing means to receive the partial products formed by said partial product producing means; at least two partial sum producing means connected to a second set of ends of said first connection and wiring means for adding specific bits of said partial product producing means in blocks; at least two second connection and wiring means having at least two sets of ends, a first set of ends connected to said first partial sum producing means to receive results of addition obtained from said first partial sum producing means; and second partial sum producing means connected to a second set of ends of said second connection and wiring means for adding together the results of addition in blocks obtained from said first partial sum producing means, said first and second connection and wiring means being formed of a first metal wiring layer for transmitting results obtained from said plurality of partial product producing means in a first direction and a second metal wiring layer formed above said first metal wiring layer for transmitting said results in a second direction nonparallel to said first direction, and at least one of said first and second connection and wiring means further comprising a third metal wiring layer formed above said second metal wiring layer.

According to another aspect of the present invention, there is provided a semiconductor device with a parallel multiplier comprising: a plurality of partial product producing means for forming partial products by multiplying one of a multiplier and a multiplicand by a specific bit of the other of the multiplier and multiplicand; a plurality of first connection and wiring means having at least two sets of ends, a first set of ends connected to said plurality of partial product producing means to receive the partial products formed by said partial product producing means; at least two first partial sum producing means connected to a second set of ends of said first connection and wiring means for adding specific bits of said partial product producing means in blocks; at least two second connection and wiring means having at least two sets of ends, a first set of ends connected to said first partial sum producing means to receive results of addition obtained from said first partial sum producing means; and second partial sum producing means connected to a second set of ends of said second connection and wiring means for adding together the results of addition in blocks obtained from said first partial sum producing means, one of said first and second connection and wiring means being formed of a first metal wiring layer for transmitting data in a first direction and a second metal wiring layer formed above said first metal wiring layer for transmitting data in a second direction nonparallel to the first direction, and the other of said first and second connection and wiring means being formed of a third metal wiring layer formed above said second metal wiring layer for transmitting data in a third direction nonparallel to at least said second direction.

According to still another aspect of the present invention, there is provided a semiconductor device with a parallel multiplier comprising: a plurality of partial product producing means for forming partial products by multiplying one of a multiplier and a multiplicand by a specific bit of the other of the multiplier and multiplicand; a plurality of connection and wiring means having at least two sets of ends, a first set of ends connected to said plurality of partial product producing means to receive the partial products formed by said partial product producing means, said connection and wiring means comprising a first metal wiring layer for transmitting results obtained from said plurality of partial product producing means in a first direction, a second metal wiring layer formed above said first metal wiring layer for transmitting said results in a second direction nonparallel to said first direction, and a third metal wiring layer formed above said second metal wiring layer for transmitting said results in a third direction nonparallel to at least the second direction; at least two partial sum producing means connected to a second set of ends of said first connection and wiring means for adding specific bits of said partial product producing means in blocks.

BRIEF DESCRIPTION OF THE DRAWINGS

The aforementioned aspects and other features of the present invention are explained in the following description, taken in connection with the accompanying drawings in which:

FIG. 6 is a sectional view of the semiconductor device of FIG. 5;

FIG. 7 schematically illustrates a circuit arrangement according to an embodiment of the present invention;

DETAILED DESCRIPTION OF THE PREFERRED EMBODIMENTS

Figures 1, 2:
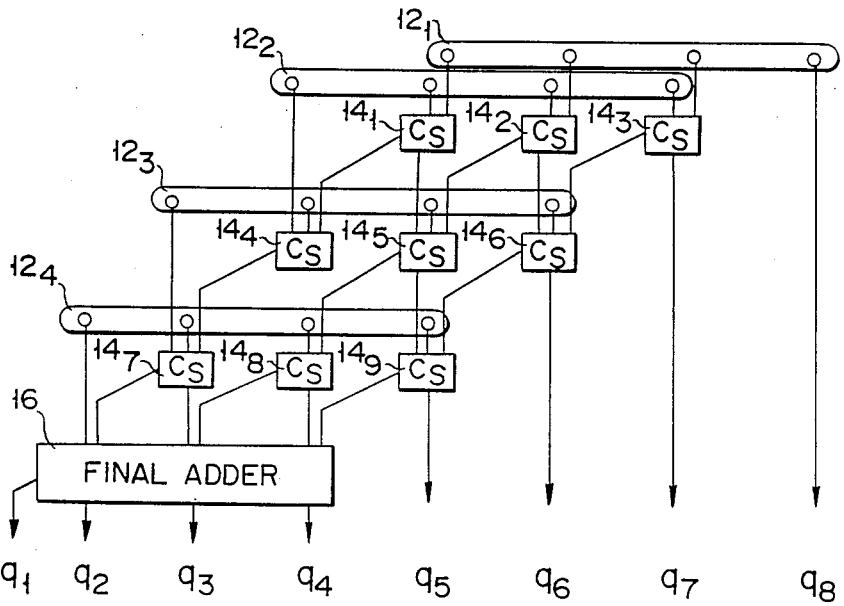
FIG. 1 illustrates the process of parallel multiplication in a prior art.
FIG. 2 is a schematic diagram of a prior art parallel multiplier for the carry save method.

Preferred embodiments of the present invention will now be described with reference to the drawings in which like reference characters are used to designate corresponding parts in the prior arts described above and the description thereof will be omitted.

Figure 3:
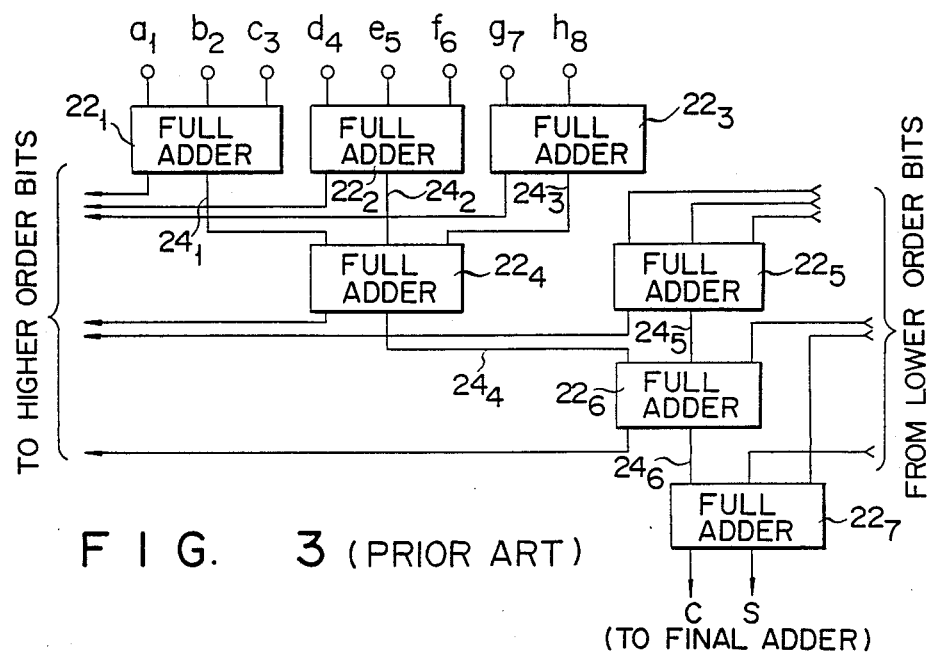
FIG. 3 is a schematic diagram of a prior art parallel multiplier for the tree method.
Figure 4:
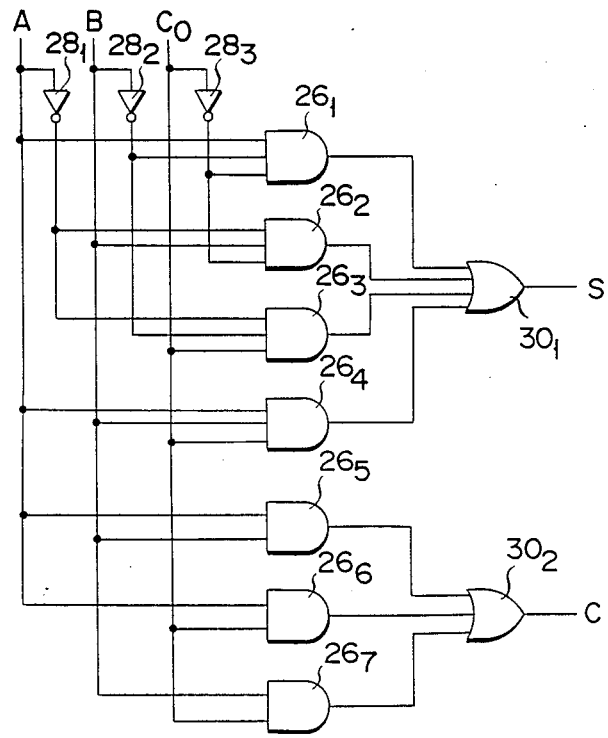
FIG. 4 is a basic circuit diagram of a prior art full adder of AND-OR type.
Figure 5:
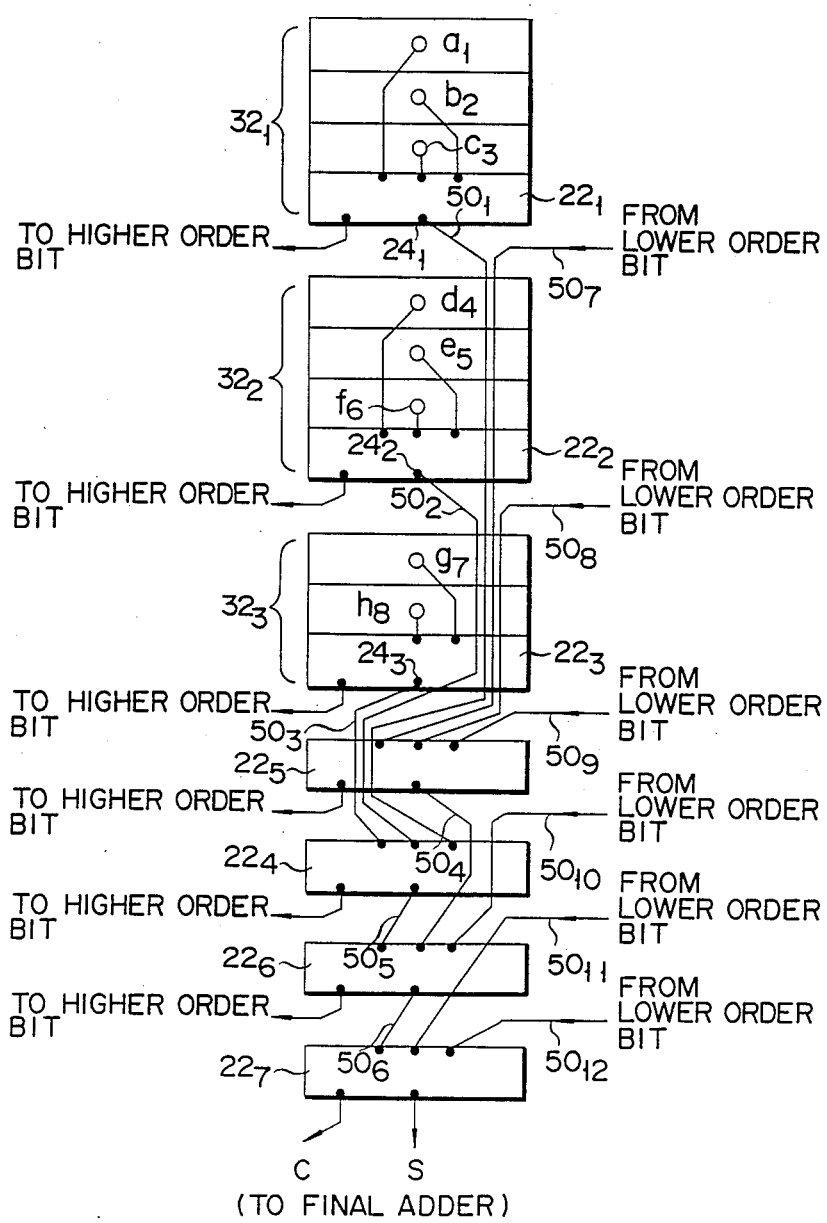
FIG. 5 is a schematic plan view of the main portion of a semiconductor device according to an embodiment of the present invention.

FIG. 5 illustrates an arrangement for implementing adder 20 for the specific bits of the partial product sets in the prior art shown in FIG. 1. The device of this embodiment is adapted for the tree method of FIG. 3. In FIG. 5, $32_1$, $32_2$ and $32_3$ designate unit blocks each serving as a partial sum producing circuit for specific bits. For example, partial sum producing circuit $32_1$ is adapted to add together specific bits $a_1$, $b_2$ and $c_3$ in full adder $22_1$, the resulting partial sum $24_1$ being output to full adder $22_4$ and the carry to the higher order bit not shown.

Likewise partial sum producing circuit $32_2$ is adapted to add together specific bits $d_4$, $e_5$ and $f_6$ in full adder $22_2$, the resulting partial sum $24_2$ being output to full adder $22_4$ and the carry to the higher order bit not shown. Partial sum producing circuit $32_3$ is adapted to add together specific bits $g_7$ and $h_8$ in full adder $22_3$, the resulting partial sum $24_3$ being output to full adder $22_4$ and the carry to the higher order bit not shown.

Referring now to FIG. 6, bit adder section 20 includes a first metal wiring layer 36 formed on a substrate 34. A first insulating layer 38 is formed on substrate 34 with first metal wiring layer 36 formed thereon. A contact hole 40 is formed in a desired position of first insulating layer 38 to expose first metal wiring layer 36. A second metal wiring layer 42 is then formed on first insulating layer 38 normally vertical to first metal wiring layer 36. First and second metal wiring layers 36 and 42 are formed to intersect each other, thus contact each other through contact hole 40. A second insulating layer 44 is formed on second metal wiring layer 42. Subsequently on second insulating layer 44 is formed a third metal wiring layer 48 which is adapted to contact second metal wiring layer 42 through a contact hole 46. Third metal wiring layer 48 is formed normally vertical to second metal wiring layer 42.

For connections of bits $a_1$, $b_2$ and $c_3$ to full adder $22_1$ in partial sum producing circuit $32_1$, bits $d_4$, $e_5$ and $f_6$ to full adder $22_2$ in partial sum producing circuit $32_2$ and bits $g_7$ and $h_8$ to full adder $22_3$ in partial sum producing circuit $32_3$, first and second metal wiring layers 36 and 42 are utilized. For connections $50_1$, $50_2$ and $50_3$ of partial sums $24_1$, $24_2$ and $24_3$ output from full adders $22_1$, $22_2$ and $22_3$, to full adder $22_4$, third metal wiring layer 48 is utilized. The same is true of connections among full adders $22_4$ to $22_7$. Therefore, the connections among inputs and outputs of full adders $22_1$ to $22_7$ are each made by third metal wiring layer 48 or a metal layer not shown which may extend over the third metal wiring layer.

As described above, third metal wiring layer 48 is used for connecting wires $50_1$, $50_2$ and $50_3$. Likewise third metal wiring layer 48 may also be used for connection wires $50_4$, $50_5$ and $50_6$ between full adders $22_4$ and $22_6$, $22_5$ and $22_6$, and $22_6$ and $22_7$, for wires for connecting carries from lower order bits not shown to full adder $22_5$, and for wires for connecting carries from lower order bits not shown to full adders $22_6$ and $22_7$. The same is true of connection of the carry output from each of full adders $22_1$ to $22_7$.

FIG. 7 shows one example of an arrangement for implementing an adder for set 20 of partial products $a_1$ to $h_8$. In this example, an array 54 of full adders serving as partial sum producing circuits is used for adding together partial products obtained from partial product producing circuits $52_1$, $52_2$ and $52_3$. Likewise an array 56 of full adders is used for adding together partial products obtained from partial product producing circuits $52_4$, $52_5$ and $52_6$, while an array 58 of full adders is used for adding together partial products obtained from partial product producing circuits $52_7$ and $52_8$. Partial product producing circuits $52_1$ to $52_8$ correspond to partial products $10_1$ to $10_8$, respectively. Reference numeral 60 designates a full adder for adding the result of full adders 54, 56, 58, while 62 a high-speed adder serving as a final adder. A portion 64 enclosed with dotted lines represents the whole of specific-bit adder 20 shown in FIG. 5. That portion of full adder 60 which is included in portion 64 involves full adders $22_4$ to $22_7$ described above.

As shown in FIG. 7, partial product producing circuits $52_1$ to $52_3$ and full adder array 54; partial product producing circuits $52_4$ to $52_6$ and full adder array 56; and partial product producing circuits $52_7$ and $52_8$ and full adder array 58 are grouped in block units. Circuits within each block unit are connected together by first and second metal wiring layers 36 and 42 shown in FIG. 6. Specific bit partial sum producing circuit $32_1$ of FIG. 5 corresponds to specific bits of each of these blocks, for example, specific bits of partial product producing circuits $52_1$ to $52_3$ and full adder array 54 within the portion 64. Connections of full adder arrays 54, 56 and 58 to full adder 60 are made by the use of third metal wiring layer 48.

By arranging as described above, the partial products produced by the partial product producing circuits are properly input to full adders $22_1$ to $22_3$, the outputs (partial sums) of full adders $22_1$ to $22_3$ are added together in full adders $22_4$ to $22_7$ and then the product (answer) is obtained through high-speed adder 62.

According to the present embodiment, by utilizing third metal wiring layer 48 for connections of inputs and outputs of full adders, jumping wiring is made possible to block units. This can decrease the area of a tree-type parallel multiplier and facilitate high-speed processing. In addition, the use of the third metal wiring layer reduces constraints imposed on the layout design of the partial products producing circuits and partial sum producing circuits, thus permitting flexibility in design. Furthermore, the partial product producing circuits and partial sum producing circuits can be implemented in a regular pattern.

Figure 8:
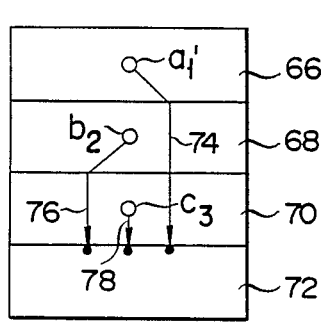
FIG. 8 is a plan view showing a partial sum producing circuit arrangement according to another embodiment of the present invention.

FIG. 8 schematically shows a partial sum producing circuit of another embodiment of the present invention.

For example, first and second metal wiring layers 36 and 42 shown in FIG. 6 are used for connecting partial products $a1'$ and $c3'$ output from partial product producing circuits 66 and 70 to full adder 72, while third metal wiring layer 48 is used for connecting partial product $b2'$ output from partial product producing circuit 68 to full adder 72. This will facilitate the layout of wiring and connection between full adder 72 and partial product producing circuit 68.

Figure 9:
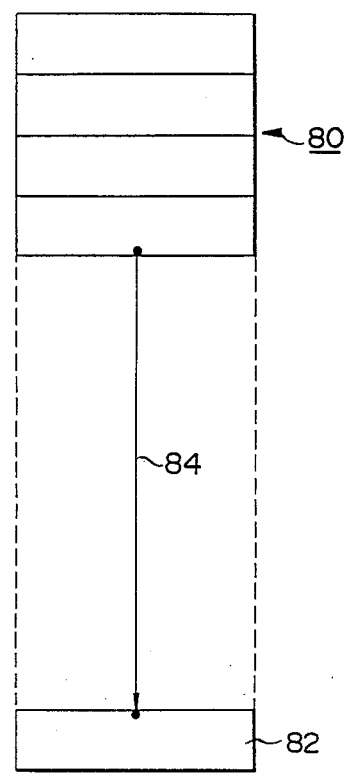
FIG. 9 is a schematic plan view of the main portion of a semiconductor device according to still another embodiment of the present invention.

FIG. 9 shows still another embodiment of the present invention, in which the output of partial sum producing circuit 80 and the input of partial sum producing circuit 82 are connected together by a wire 84. In this case third metal wiring layer 48 is used for wire 84. The third metal wiring layer may be used for wiring and connections within partial sum producing circuit 80. Alternatively, only the first and second metal wiring layers may be used in 80. Although a partial product producing circuit or circuits may be placed between partial sum producing circuits 80 and 82, it is necessary only that the third metal wiring layer be used at least for wiring and connections between partial sum producing circuits. For this reason, even if another circuit or circuits are placed between circuits to be connected together, the use of the third metal wiring layer will facilitate the layout of wiring and connections.

With the above embodiments, the metal wiring layers are described as being composed of three layers. However, the number of the metal wiring layers need not be limited to three, and three or more metal wiring layers may be used. The way of dividing the partial product and partial sum producing circuit blocks is not limited to those described in connection with the above embodiments and may be carried out variously.

What is claimed is:

1. A semiconductor device with a parallel multiplier comprising:

a plurality of partial product producing means for forming partial products by multiplying one of a multiplier and a multiplicand by a specific bit of the other of the multiplier and multiplicand;

a plurality of first connection and wiring means having two sets of ends, the first set of ends being connected to said plurality of partial product producing means to receive the partial products formed by said partial product producing means;

at least two first partial sum producing means connected to the second set of ends of said first connection and wiring means for adding specific bits of said partial product producing means in blocks;

at least two second connection and wiring means having two sets of ends, the first set of ends being connected to said first partial sum producing means to receive results of addition obtained from said first partial sum producing means; and second partial sum producing means connected to the second set of ends of said second connection and wiring means for adding together the results of addition in blocks obtained from said first partial sum producing means, said first and second connection and wiring means being formed on a first metal wiring layer for transmitting results obtained from said plurality of partial product producing means in a first direction and a second metal wiring layer formed above said first metal wiring layer for transmitting said results in a second direction nonparallel to said first direction, and at least one of said first and second connection and wiring means further comprising a third metal wiring layer formed above said second metal wiring layer.

2. A device according to claim 1, wherein said first and second metal wiring layers are formed to intersect each other, and said second and third metal wiring layers are formed to intersect each other.

3. A device according to claim 1, wherein at least said second connection and wiring means of said first and second connection and wiring means comprises said first, second and third metal wiring layers.

4. A device according to claim 1, wherein said first connection and wiring means is formed of said first and second metal wiring layers, and said second connection and wiring means is formed of said first, second and third metal wiring layers.

5. A device according to claim 2, wherein said first metal wiring layer and said second metal wiring layer across at a right angle, and said second metal wiring layer and said third metal wiring layer cross at a right angle.

6. A semiconductor device with a parallel multiplier comprising:

a plurality of partial product producing means for forming partial products by multiplying one of a multiplier and a multiplicand by a specific bit of the other of the multiplier and multiplicand;

a plurality of first connection and wiring means having two sets of ends, the first set of ends being connected to said plurality of partial product producing means to receive the partial products formed by said partial product producing means;

at least two first partial sum producing means connected to the second set of ends of said first connection and wiring means for adding specific bits of said partial product producing means in blocks;

at least two second connection and wiring means having two sets of ends, the first set of ends being connected to said first partial sum producing means to receive results of addition obtained from said first partial sum producing means; and second partial sum producing means connected to the second set of ends of said second connection and wiring means for adding together the results of addition in blocks obtained from said first partial sum producing means, one of said first and second connection and wiring means being formed of a first metal wiring layer for transmitting data in a first direction and a second metal wiring layer formed above said first metal wiring layer for transmitting data in a second direction nonparallel to the first direction, and the other of said first and second connection and wiring means being formed of a third metal wiring layer formed above said second metal wiring layer for transmitting data in a third direction nonparallel to at least said second direction.

7. A device according to claim 6, wherein said first and second metal wiring layers are formed to intersect each other, and said second and third metal wiring layers are formed to intersect each other.

8. A device according to claim 6, wherein at least said second connection and wiring means of said first and second connection and wiring means comprises said third metal wiring layers.

9. A device according to claim 6, wherein said first connection and wiring means is formed of said third metal wiring layer, and said second connection and wiring means is formed of said first and second metal wiring layers.

10. A device according to claim 6, wherein said first metal wiring layer and said second metal wiring layer cross at a right angle, and said second metal wiring layer and said third metal wiring layer cross at a right angle.

11. A semiconductor device with a parallel multiplier comprising:

a plurality of partial product producing means for forming partial products by multiplying one of a multiplier and a multiplicand by a specific bit of the other of the multiplier and multiplicand;

a plurality of connection and wiring means having two sets of ends, the first set of ends being connected to said plurality of partial product producing means to receive the partial products formed by said partial product producing means, said connection and wiring means comprising:

a first metal wiring layer, for transmitting results obtained from said plurality of partial product producing means in a first direction, a second metal wiring layer formed above said first metal wiring layer for transmitting said results in a second direction nonparallel to said first direction, and a third metal wiring layer formed above said second metal wiring layer for transmitting said results in a third direction nonparallel to at least the second direction; and at least two partial sum producing means connected to the second set of ends of said first connection and wiring means for adding specific bits of said partial product producing means in blocks.

12. A device according to claim 11, wherein said first and second metal wiring layers are formed to intersect each other, and said second and third metal wiring layers are formed to intersect each other.

13. A device according to claim 11, wherein said first metal wiring layer and said second metal wiring layer cross at a right angle, and said second metal wiring layer and said third metal wiring layer cross at a right angle.

* * * * *